United States Patent
Juchnowycz

(10) Patent No.: US 8,164,308 B2
(45) Date of Patent: Apr. 24, 2012

(54) APPARATUS AND METHOD FOR CAPTURING COSMIC BACKGROUND RADIATION AND CONVERTING THE SAME TO ELECTRICITY

(76) Inventor: Stefan Juchnowycz, Hendersonville, NC (US)

( * ) Notice: Subject to any disclaimer, the term of this patent is extended or adjusted under 35 U.S.C. 154(b) by 92 days.

(21) Appl. No.: 12/821,189

(22) Filed: Jun. 23, 2010

(65) Prior Publication Data

US 2011/0006740 A1 Jan. 13, 2011

Related U.S. Application Data

(60) Provisional application No. 61/224,255, filed on Jul. 9, 2009, provisional application No. 61/235,756, filed on Aug. 21, 2009.

(51) Int. Cl.
| | | |
|---|---|---|
| *H02J 7/00* | (2006.01) | |
| *H04B 1/00* | (2006.01) | |
| *G01J 5/02* | (2006.01) | |
| *H02M 7/48* | (2007.01) | |
| *G01S 13/00* | (2006.01) | |

(52) U.S. Cl. ........ 320/137; 375/135; 375/219; 375/308; 375/375; 250/339.06; 250/354.1; 363/8; 363/13; 363/178; 342/6; 342/61; 342/73; 342/173; 342/17

(58) Field of Classification Search .................... 320/137
See application file for complete search history.

(56) References Cited

U.S. PATENT DOCUMENTS

| | | | |
|---|---|---|---|
| 3,375,370 A | | 3/1968 | Hilborn |
| 3,670,494 A | | 6/1972 | Papp |
| 4,684,337 A | * | 8/1987 | Bauer ........................... 425/135 |
| 4,801,113 A | * | 1/1989 | Engelhardt .................... 244/121 |
| 5,123,039 A | | 6/1992 | Shoulders |
| 5,303,117 A | * | 4/1994 | Ogihara et al. ............... 361/233 |
| 5,590,031 A | * | 12/1996 | Mead et al. ....................... 363/8 |
| 6,477,028 B1 | * | 11/2002 | Pinto ............................ 361/233 |
| 6,665,167 B2 | * | 12/2003 | Pinto ............................ 361/233 |
| 6,982,428 B2 | | 1/2006 | Stresau et al. |
| 2004/0011962 A1 | | 1/2004 | Chin et al. |
| 2004/0163942 A1 | * | 8/2004 | Yoshida et al. .......... 204/157.15 |
| 2006/0118729 A1 | | 6/2006 | Chin et al. |
| 2007/0137696 A1 | | 6/2007 | Krokoszinski et al. |
| 2008/0078964 A1 | | 4/2008 | Kojima |
| 2008/0121809 A1 | | 5/2008 | Friedman et al. |
| 2008/0185916 A1 | * | 8/2008 | Corum et al. ................... 307/73 |
| 2008/0253010 A1 | | 10/2008 | Cruz |
| 2008/0302357 A1 | | 12/2008 | DeNault |
| 2009/0086913 A1 | | 4/2009 | Ohta et al. |

FOREIGN PATENT DOCUMENTS

| | | |
|---|---|---|
| FR | 2635238 | 2/1990 |
| GB | 1023117 | 3/1966 |
| WO | WO 99/43007 | 8/1999 |
| WO | WO 2005/022552 A1 | 3/2005 |

* cited by examiner

*Primary Examiner* — Yalkew Fantu

(74) *Attorney, Agent, or Firm* — Carter & Schnedler, P.A.

(57) ABSTRACT

There is provided an apparatus for capturing cosmic background radiation and for converting cosmic background radiation into electricity. An antenna is configured so as to capture cosmic background radiation. An electrostatic electron multiplier is connected to the antenna. A high voltage power supply is connected to the electrostatic electron multiplier whereby cosmic background radiation is converted to electricity.

18 Claims, 2 Drawing Sheets

APPARATUS AND METHOD FOR CAPTURING COSMIC BACKGROUND RADIATION AND CONVERTING THE SAME TO ELECTRICITY

RELATIONSHIP TO PRIOR APPLICATION

This is a U.S. non-provisional application relating to and claiming the benefit of U.S. Provisional Patent Application Ser. No. 61/224,255, filed Jul. 9, 2009, and U.S. Provisional Patent Application Ser. No. 61/235,756, filed Aug. 21, 2009.

BACKGROUND OF THE INVENTION

This invention relates to the use of isothermal radiation of the universe to produce alternative energy on Earth. More particularly, it relates to the use of the cosmic background heat radiation of the universe to produce electricity.

Modern twentieth century physicists and astronomers have abandoned the philosophical concept of the static universe for the experimentally verified theory of Big Bang, a fiery origin of universes. The Big Bang occurred eons ago at immense temperatures and it created its own space where none existed before, and it is expanding at the speed of light. Inside the expanding space there was and still is thermal equilibrium where the primordial particles collided with each other with originally high energies, thus preventing creation of more complex, heavier atomic elements. As the fireball of universe expanded, it cooled and the energies of colliding primeval particles decreased allowing formation of heavier atomic elements which are building blocks of galaxies and solar systems, including planet Earth.

The separation of energies of mass ($E=mc^2$), and energy of thermal cosmic radiation made the universe transparent to this radiation. Heat energy in the form of cosmic background radiation (CBR) streams in all directions within the expanding space. Today's cosmic space of Earth is flooded with radiation noise at 3° K temperature.

As recently as 1965, Arno Penzias and Robert Wilson discovered this thermal noise equivalent to 3° K while testing a large aperture antenna. For their discovery and their interpretation of radiation in microwave frequency they were awarded the Nobel Prize in 1967.

Further investigations followed discovery that the radiation was of identical temperature all over Earth (isothermal) and isotropic which means equally intense in all directions.

The isothermal and isotropic radiation constitutes conditions for conversion of CBR into the alternative energy on Earth.

SUMMARY OF THE INVENTION

In accordance with one form of this invention, there is provided an apparatus for capturing cosmic background radiation and for converting cosmic background radiation into electricity. The apparatus includes an antenna configured so as to capture cosmic background radiation. An electrostatic electron multiplier is connected to the antenna. A high voltage power supply is connected to the electrostatic electron multiplier whereby cosmic background radiation is converted into electricity.

In accordance with another form of this invention, there is provided a method for capturing cosmic background radiation and for converting cosmic background radiation into electricity. Cosmic background radiation is captured by an antenna. The signal from the antenna is amplified and converted into a lower frequency by an electrostatic electron multiplier and high voltage power supply whereby cosmic background radiation is converted into electricity.

DESCRIPTION OF THE PREFERRED EMBODIMENT

Figure 1:
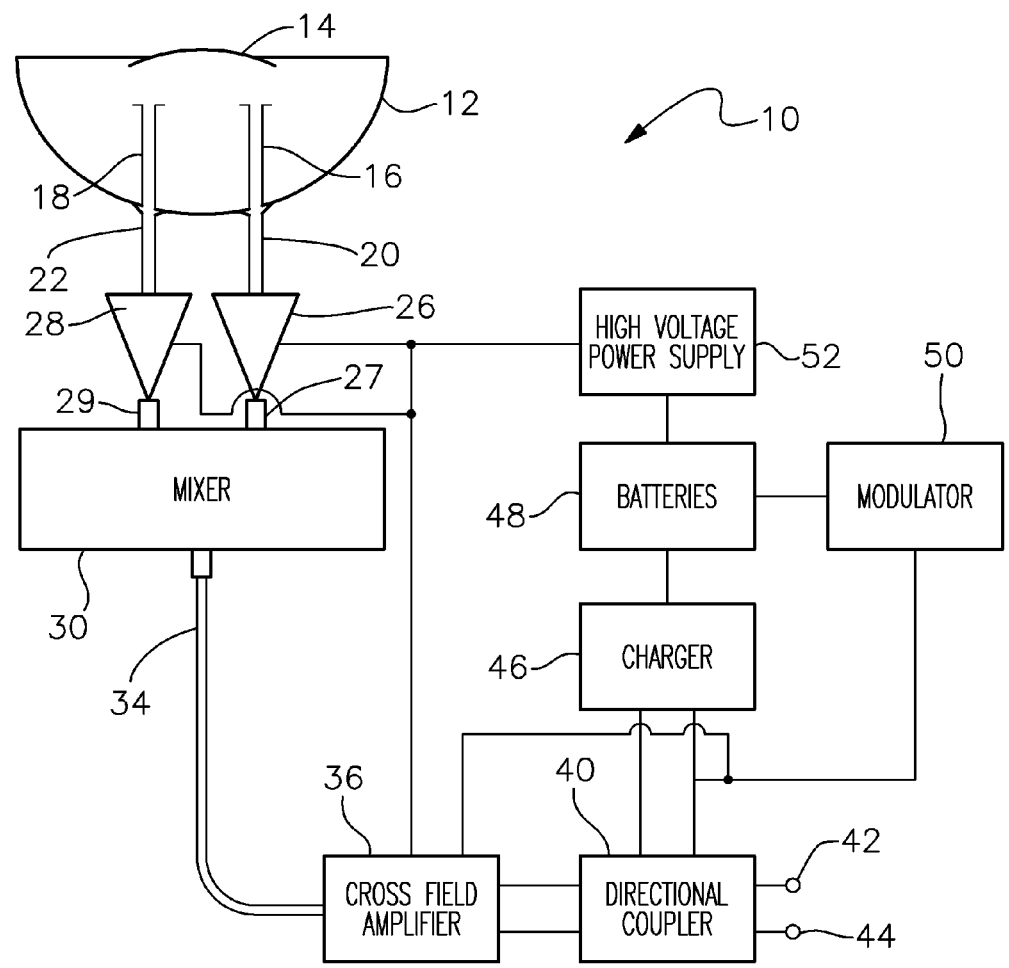
FIG. 1 is a schematic diagram showing one embodiment of the invention.

The invention analyzes and isolates the unique properties of cosmic background radiation (CBR) which allows it to couple to a machine, called a "generator," located on Earth.

The "generator" (a) uses inexhaustible energy of the universe to directly convert it into alternative electrical energy on Earth; (b) can be located and operated in any arbitrary location on Earth, even as a mobile unit, without modification; (c) requires no transportation of any supplied energy to operate; and (d) produces neither solid waste nor air pollution. The "generator" may operate as an individual unit supplying electrical energy to individual households or transportation vehicles.

There are three steps described herein. The first step validates the existence of CBR energy in the universe in the form of thermal noise. The second step uses Max Planck's Law of Radiation to define the existence of the microwave spectrum in the universe and quantitatively defines its intensity. The third step describes the "generator" which captures, isolates and amplifies the CBR energy of the universe into the useful electrical energy.

Generally speaking, the invention calls for the conversion of the microwave frequency electrical energy of CBR into 60 cycle, AC power on Earth.

CBR has been experimentally confirmed to be isothermal in any location on Earth and has been theoretically proven to be so in the entire universe. It means that the temperature of thermal radiation of 3° K persists anywhere on Earth where the "generator" of the alternative energy would be located.

CBR has also experimentally found to be isotropic across the entire Earth and theoretically proven to be so over the entire universe. It means that the entire frequency spectrum (in the microwave region) is equally intense not only across the universe but also in every direction within the universe wherever the "generator" would be located.

These unique properties of CBR are fundamental to conversion of CBR to the alternative energy.

It has been established experimentally and reported at the meeting of the American Astronomical Society in January 1990 that the frequency spectrum of CBR in the microwave region matches the radiation spectrum of the black body radiation formulated ninety years earlier by Max Planck. What it means is that the Big Bang's aftereffect in the form of CBR can be represented quantitatively by the equivalent black body radiation formulated by Max Planck.

Max Planck formulated the law of black body radiation which applies to almost all considerations derived from it. Some of these considerations allow one to calculate the intensity of Radiant Emittance in watts $cm^{-2}$ wavelength$^{-1}$ (watts per centimeter$^2$ per wavelength).

The Radiant Emittance of CBR at 3° K is derived from the consideration that leads directly to the Radiant Emittance of black body. This is done as follows:

(a) Using Wien's Displacement Law (one of the considerations of Planck's Law), which allows one to derive the wavelength $\lambda max$, at which a maximum intensity of Radiant Emittance, at 3° K occurs $$\lambda \max T° K = 2897.9° K$$

where wavelength is micrometers (one micrometer=$10^{-6}$ meter).

Note that this equation represents a straight line.

Figure 2:
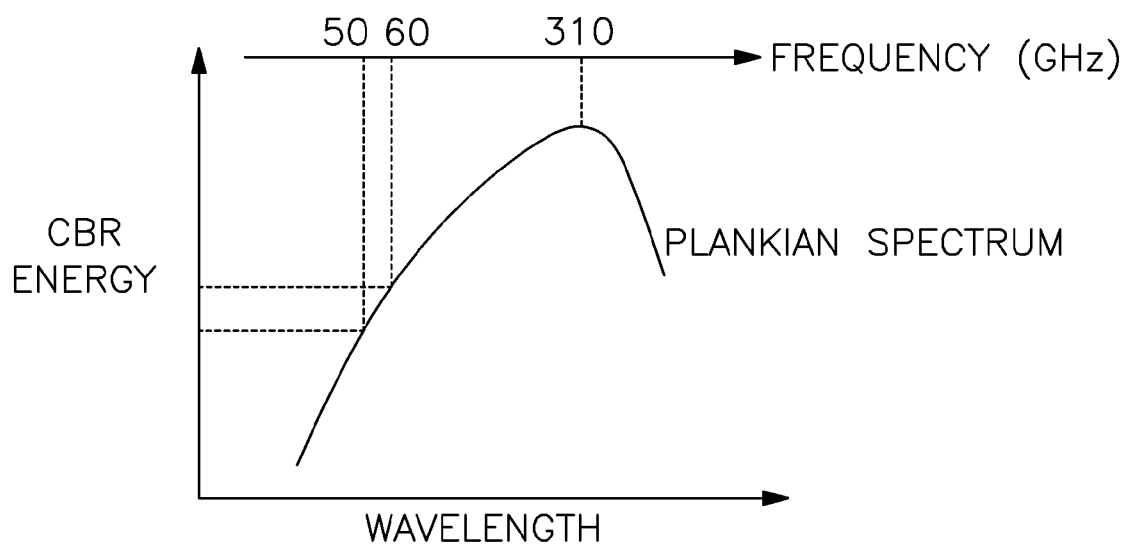
FIG. 2 is a graph showing the Plankian Spectrum.

(b) Once the $\lambda$max for 3° K is known the actual intensity of Radiant Emittance of CBR "in situ" of "generator," can be extrapolated from the plot of Planck's equation Radiant Emittance versus wavelength (see *Handbook of Military Infrared Technology* compiled by William Wolfe, University of Michigan 1965 edition, p. 20, FIG. 2.8).

By sliding the Planck's curve along the straight line (representing Wien's Displacement Law) to the wavelength of $\lambda$max for 3° K, the extrapolated value of the Radiant Emittance can be found as:

$$1.2 \times 10^{-11} \text{ Wcm}^{-2} \text{ wavelength}^{-1}$$

The $\lambda$max for 3° K (present temperature of CBR) occurs at the frequency of 310 Gigahertz which requires very specialized hardware.

Instead by choosing a lower frequency of 60 GHz, the hardware of "generator" is simplified since microwave components at that frequency are commercially available. The change from 310 GHz to 60 GHz reduces the extrapolated power (Radiant Emittance) by 97% to $3.6 \times 10^{-13}$ Wcm$^{-2}$ wavelength$^{-1}$ (see FIG. 2.6, *Handbook of Military Infrared Technology* compiled by William Wolfe, University of Michigan 1965 edition).

The level of CBR Radiant Emittance anywhere on the Earth as discussed above is $3.6 \times 10^{-13}$ Wcm$^{-2}$ wavelength$^{-1}$ at 60 GHz frequency. This level is low compared to the level of man-made communication signals. Furthermore, the components used in the assembly of "generator" will generate their own noise at the terminals of the components either due to temperature of environment "in situ" of "generator" or due to operating currents (motion of electrons). The object to preserve purity of 60 GHz CBR is to keep these interferences well below the level of CBR.

The design of "generator" uses the unique properties of CBR to:

(a) isolate CBR energy from man-made interferences;
(b) keep the Johnson noise of antenna well below the energy of CBR at 60 GHz; and
(c) amplify the CBR energy without use of thermionic amplifiers, which generate noise.

The isotropic properties of CBR provides an equal intensity of radiation independent of the orientation of the antenna main lobe.

By orienting resonant antenna towards the sky the temperature of antenna becomes equal to the temperature of the sky, which can be assumed at 3° K, and not the temperature of the antenna structure (see "Electromagnetism" by D. Krane and Kevin R. Carber, p. 700). By doing so, the noise power per unit bandwidth becomes:

$W$/wavelength=$KT$ where $K$ is Boltzman's constant of $1.38 \times 10^{-23}$ and $T$ is temperature of the sky Hence the noise generated by the sky $N_s$ oriented antenna will be ($N_0$)

$W$/wavelength=$3 \times 1.38 \times 10^{-23} W$ cm$^{-2}$ wavelength$^{-1}$

Hence the CBR signal to noise ratio:

$$\frac{S(60 \text{ GHz})}{N_0} = \frac{3.6 \times 10^{-13}}{3 \times 1.38 \times 10^{-23}} = 8.7 \times 10^9$$

or nine orders higher than noise.

Further on, by orienting the antenna towards the sky, the interference by man-made signals will be eliminated.

Preferably the antenna:

(1) is parabolic with a virtual aperture 60 centimeters in diameter;
(2) operates at a frequency of 60 gigahertz and connected to a wave guide terminated in multiple deformed dipoles (which eliminate the null-poles typical to regular straight dipoles);
(3) has a power gain (referenced to dipoles) of 86,400 (see "Electronics in Communications" by Sol Lapatrine, pp. 256-259);
(4) has a temperature of 3 degrees Kelvin; and
(5) has low noise of $4.14 \times 10^{-23}$ Watts per wavelength.

Typically in man-made communication systems, the amplifiers used are thermionic: tubes, travelling wave tubes, klystrons. All of them are powerful amplifiers of extremely low signals. They also are plagued by high noise (Johnson noise, shot noise, fluctuation of voltage across terminals of resistors). Further, they need assortments of supplies to operate the thermionic tubes, all sources of noise.

To retain trueness of 60 GHz CBR signals, the "generator" needs a powerful amplifier without use of a noisy thermionic amplifier. This can be provided by secondary electron emission. The device needs only high voltage supply of preferably 1250V dc to produce high power gain. It is called an Electrostatic Electron Multiplier (EEM), such as one made by CBS Laboratories for the guidance system of the Lunar Orbiter which provides gain of $10^6$. It can be temporarily opened to air to couple it to antenna input. The device is well adapted to a microwave system.

The EEM operating at microwave frequency receives a weak CW (continuous wave) signal from antenna. It generates secondary emission electrons of increasing current density, which multiplies the weak signal many thousands times. The EEM becomes the current density variation power amplifier.

Power amplification of 230,000 has been achieved by a commercially available EEM.

The effect of EEM at the output of antenna reduces thermal noise by a factor of its gain squared (typically $10^{10}$-$10^{12}$) down along the "generator" system. Since "generator" uses the unmodulated signal (CW signal), it acts as power amplifier of only $10^6$. This ruggedized assembly exposed to typical ambient temperature of 300° K will produce Johnson's noise power of:

$$W = 1.38 \times 10^{-23} \times 300 = 414 \times 10^{-21} \text{ W/wavelength}$$

Hence the presence EEM of gain $10^6$ will decrease further noise by entire system to almost $10^{-27}$, well below the CBR power.

Referring now to FIG. 1 of the preferred embodiment which shows generator 10 which captures and converts the CBR microwave energy to the 60 cps AC power. Generator 10 includes parabolic antenna 12 and is spherical reflector 14. The dipoles 16 and 18 are received within parabolic antenna. Flanges 20 and 22 connect parabolic antenna to the waveguides 16 and 18. The dipoles receive the 60 GHz and 50 GHz frequencies to feed them into mixer 30. The mixer may be MXP-19R, commercially available from Minitech. The EEM 26 and 28 are connected to mixer 30 by flanges 27 and 29. The intermediate frequency output, at 10 GHz, of mixer 30 is connected to the flexible cable 34, which may be an RG-214.

The above assembly of the base of antenna 12, EEM 26 and 28 and the mixer's flanges are brittle and should be ruggedized in epoxy rubber to withstand many g's of generator 10.

The flexible cable 34 is connected to cross-field amplifier (CFA) 36. The output of CFA 36 is directly connected to the directional coupler 40 in support to the service system to provide AC power to the charger 46, batteries 48, high DC voltage package 52 and to the sixty cycles per second modulator 50 to amplitude modulate CFA 36. Output terminals 42 and 44 are connected to directional coupler 40 and present sixty (60) cycles per second A.C. power. The HV DC power supply is commercially available from Nelles Griot Holography.

The generator 10 may be placed at any location on Earth since the Earth is flooded with CBR. The distribution of CBR energy is in a spectrum of frequencies called the Planckian spectrum. It is the energy used by generator 10 to be converted in 60 cycles AC power.

Two frequencies, namely 60 GHz and 50 GHz, are used to operate generator 10. Each of the CBR frequencies is a continuous wave (CW) and the entire process of conversion to AC power is in the form of CW.

The CBR frequencies are in GHz ($10^9$ cycles per second). Their maximum occurs at $1.2 \times 10^{-11}$ Watt per cm$^2$ per wavelength at 310 GHz. The generator 10 uses the compromised frequency of 60 GHz, which further lowers the CBR energy to $3.6 \times 10^{-13}$ Watts per cm$^2$ per wavelength. The generator and methods described earlier enables one to isolate CBR which is now low in its intensity as compared with interferences and also noiselessly amplifies it well above their level. The lowest ratio of CBR to interferences is $10^9$.

As previously discussed, FIG. 1 shows parabolic antenna 12 with two dipoles 16 and 18 located at the center of its spherical reflector. One dipole receives the CBR frequency of 60 GHz; the second dipole receives a frequency of 50 GHz. These two frequencies are used further down the generator's system to downconvert the IF frequency output to 10 GHz, with 60 GHz wave providing input to "FR" and 50 GHz wave input to LO terminals of the mixer 30. Both outputs from the antenna dipoles are amplified by an antenna gain of 86,400 and by an EEM gain of 230,000. Since the intensities of the 60 GHz and 50 GHz outputs from the antenna are 3% of the maximum of CBR, the input energy into the mixer is $7.1 \times 10^{-3}$ Watt per wavelength. The insertion loss of the mixer is 7 db which brings the IF energy to $3.56 \times 10^{-3}$ Watt per wavelength.

It has been proven that the microwave energy of CBR, in form of a single sine frequency of 60 GHz can be isolated, noiselessly amplified and downconverted to manageable frequency of 10 GHz. It occurs at the energy level of $3.56 \times 10^{-3}$ Watt per wavelength. The conversion to power in Watt per second occurs by generator at $10^{10}$ wavelength per second. The continuous wave (CW) power is:

$$P_{10GHZ} = 3.56 \times 10^{-3} W/\lambda \times 10^{10} \lambda/sec = 3.56 \times 10^7 \text{ Watt per second}$$

when AMPLITUDE MODULATED by CFA at modulation index m–1 at 60 cps the AC power is $$P_{AC} = \frac{356}{60}\left(10^5 + \frac{m}{4}10^5\right)_{m-1} = 6.25 \times 10^5$$

which represents power of 10 GHz frequency per second plus single sideband per second.

Below is a list of the components shown in FIG. 1:
10—Generator
12—Antenna Assembly
14—Spherical reflector
16, 18—Dipoles mounted on waveguides
20, 22—Flanges to waveguides (678-007, Millitech)
26, 28—EEM, Dynode Type, 230,000 Gain each
27, 29—Flanges (678-007, Millitech)
30—Mixer (MXP-19R, Millitech)
34—10 GHz flexible Cable RG-214
36—Cross-field amplifier, cold mode operation
40—Directional coupler (10 GHz)
46—Charger to Batteries
48—Batteries, Melles Griot Labs
50—60 cycles modulator to cross-field amplifier
52—High voltage DC package (Nelles Griot Labs)

While the invention has been described in terms of the above embodiment, those skilled in the art will recognize that the invention can be practiced with modifications and other embodiments within the spirit and scope of the appended claims.

What is claimed is:

1. An apparatus for capturing cosmic background radiation at approximately 3° K and for converting cosmic background radiation into electricity comprising:
   a parabolic antenna; the parabolic antenna configured so as to directly capture cosmic background radiation having a frequency less than 310 GHz;
   an electrostatic electron multiplier; the parabolic antenna connected to the electrostatic electron multiplier; and
   a high voltage power supply connected to the electrostatic electron multiplier whereby cosmic background radiation is amplified and is converted to electricity.

2. Apparatus as set forth in claim 1, further including an amplitude modulating mixer connected to the electrostatic electron multiplier.

3. Apparatus as set forth in claim 1, further including at least one battery connected to the high voltage power supply.

4. Apparatus as set forth in claim 3, further including a battery charger connected to the battery.

5. Apparatus as set forth in claim 1, further including a cross field amplifier connected to the electrostatic electron multiplier; an output of the cross field amplifier providing AC power.

6. Apparatus as set forth in claim 5, further including a directional coupler connected to the cross-field amplifier.

7. Apparatus as set forth in claim 1 wherein the high voltage power supply provides DC voltage.

8. Apparatus as set forth in claim 6 wherein the output of the cross field amplifier is connected to the battery charger; a portion of the AC power providing current for the battery charger.

9. Apparatus as set forth in claim 1, further including a wave guide connecting the parabolic antenna to the electrostatic electron multiplier.

10. Apparatus as set forth in claim 1, further including a pair of dipoles connected to the parabolic antenna.

11. Apparatus as set forth in claim 10 wherein one of the dipoles operates at approximately 50 GHz and the other dipole operates at approximately 60 GHz.

12. Apparatus as set forth in claim 1 wherein the electricity is AC power at approximately 60 cycles per second.

13. A method for capturing cosmic background radiation at approximately 3° K and for converting cosmic background radiation into electricity comprising:
   directly capturing cosmic background radiation having a frequency less than 310 GHz with a parabolic antenna;
   amplifying the cosmic background radiation by an electrostatic electron multiplier; and converting the amplified cosmic background radiation to electricity.

14. Method as set forth in claim 13, further including providing high voltage to the electrostatic electron multiplier.

15. Method as set forth in claim 14, further including using the converted electricity for providing the high voltage to the electrostatic electron multiplier.

16. Method as set forth in claim 13, further including orienting the parabolic antenna toward the sky.

17. An apparatus for capturing cosmic background radiation at approximately 3° K and for converting cosmic background radiation into electricity comprising:
   a parabolic antenna; the parabolic antenna configured so as to directly capture cosmic background radiation having a frequency less than approximately 310 GHz;
   at least one waveguide received within the parabolic antenna;
   an electrostatic electron multiplier connected to the at least one waveguide;
   a high voltage power supply connected to the electrostatic electron multiplier;
   an output of the electrostatic electron multiplier connected to a mixer; and
   a cross field amplifier connected to the mixer; the output of the mixer being a low frequency electrical signal whereby cosmic background radiation is amplified and is converted to electricity.

18. Apparatus as set forth in claim 17 wherein the antenna operates at a frequency of approximately 60 GHz or less; a directional coupler connected to the cross field amplifier; at least one battery connected to the high voltage power supply; a battery charger connected between the battery and the directional coupler; whereby the apparatus operates without an external source of electricity.

* * * * *